US009332535B2

United States Patent
Kim et al.

(10) Patent No.: US 9,332,535 B2
(45) Date of Patent: *May 3, 2016

(54) CQI TRANSMISSION POWER CONTROL METHOD AND APPARATUS FOR WIRELESS COMMUNICATION SYSTEM SUPPORTING MULTI-CELL HSDPA

(71) Applicant: Samsung Electronics Co., Ltd., Gyeonggi-do (KR)

(72) Inventors: Young Bum Kim, Seoul (KR); Youn H. Heo, Gyeonggi-do (KR); Ju Ho Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/519,856

(22) Filed: Oct. 21, 2014

(65) Prior Publication Data

US 2015/0036643 A1  Feb. 5, 2015

Related U.S. Application Data

(63) Continuation of application No. 13/130,716, filed as application No. PCT/KR2009/006946 on Nov. 24, 2009.

(30) Foreign Application Priority Data

Nov. 25, 2008  (KR) .................. 10-2008-0117215

(51) Int. Cl.
*H04W 72/04* (2009.01)
*H04L 5/00* (2006.01)
(Continued)

(52) U.S. Cl.
CPC ........... *H04W 72/0406* (2013.01); *H04L 1/007* (2013.01); *H04L 1/0026* (2013.01);
(Continued)

(58) Field of Classification Search
CPC  H04W 72/0406; H04L 5/0048; H04L 5/0055
USPC .......................................... 370/336; 455/522
See application file for complete search history.

(56) References Cited

U.S. PATENT DOCUMENTS

| 7,054,633 B2 | 5/2006 | Seo et al. |
| 7,961,700 B2 | 6/2011 | Malladi et al. |

(Continued)

FOREIGN PATENT DOCUMENTS

| CN | 1476687 | 2/2004 |
| CN | 101233775 | 7/2008 |

(Continued)

OTHER PUBLICATIONS

PCT/ISA/237 Written Opinion issued on PCT/KR2009/006946 (3 pp.).

(Continued)

*Primary Examiner* — Mark Rinehart
*Assistant Examiner* — Gbemileke Onamuti
(74) *Attorney, Agent, or Firm* — The Farrell Law Firm, P.C.

(57) ABSTRACT

A method and apparatus are provided for transmitting and receiving control information in a wireless communication system supporting multi-cell transmission. A method includes receiving a first pilot signal from a first cell and a second pilot signal from a second cell; generating first control information indicating channel quality for the first cell and second control information indicating channel quality for the second cell, based on the first pilot signal and the second pilot signal, respectively; separately encoding the first control information and the second control information; separately power controlling the encoded first control information and the encoded second control information; transmitting, on the first cell, the power controlled, encoded first control information on a first control channel; and transmitting, on the first cell, the power controlled, encoded second control information on a second control channel.

24 Claims, 7 Drawing Sheets

(51) Int. Cl.
*H04L 1/00* (2006.01)
*H04L 1/16* (2006.01)
*H04L 1/18* (2006.01)
*H04W 24/10* (2009.01)
*H04W 52/32* (2009.01)

(52) U.S. Cl.
CPC ............ *H04L1/0073* (2013.01); *H04L 5/0048* (2013.01); *H04L 5/0055* (2013.01); *H04L 1/1607* (2013.01); *H04L 1/1812* (2013.01); *H04W 24/10* (2013.01); *H04W 52/325* (2013.01)

(56) References Cited

U.S. PATENT DOCUMENTS

| | | | |
|---|---|---|---|
| 8,219,888 | B2 | 7/2012 | Chen |
| 8,675,743 | B2 | 3/2014 | Kotecha et al. |
| 2002/0141367 | A1 | 10/2002 | Hwang et al. |
| 2003/0045321 | A1 | 3/2003 | Kim et al. |
| 2004/0116139 | A1 | 6/2004 | Yi et al. |
| 2004/0166887 | A1* | 8/2004 | Laroia et al. ............ 455/522 |
| 2005/0020260 | A1 | 1/2005 | Jeong et al. |
| 2006/0286996 | A1 | 12/2006 | Julian et al. |
| 2007/0041349 | A1 | 2/2007 | Kim et al. |
| 2007/0176681 | A1 | 8/2007 | Matsumoto |
| 2008/0051127 | A1 | 2/2008 | Xu |
| 2008/0070611 | A1 | 3/2008 | Yi et al. |
| 2009/0047911 | A1 | 2/2009 | Rao et al. |
| 2009/0201885 | A1 | 8/2009 | Kuroda et al. |
| 2009/0245212 | A1* | 10/2009 | Sambhwani et al. ......... 370/336 |
| 2009/0279445 | A1 | 11/2009 | Nogami et al. |
| 2011/0026478 | A1 | 2/2011 | Lee et al. |
| 2012/0176996 | A1 | 7/2012 | Kim et al. |
| 2012/0269159 | A1 | 10/2012 | Inoue et al. |
| 2013/0242948 | A1 | 9/2013 | Sambhwani |

FOREIGN PATENT DOCUMENTS

| | | |
|---|---|---|
| GB | 2 415 324 | 12/2005 |
| JP | 2002-369258 | 12/2002 |
| JP | 2008-539667 | 11/2008 |
| KR | 1020040041289 | 5/2004 |
| WO | WO 2006/043712 | 4/2006 |
| WO | WO 2007/072828 | 6/2007 |

OTHER PUBLICATIONS

PCT/ISA/210 Search Report issued on PCT/KR2009/006946 (4 pp.).
Qualcomm Europe, "HS-DPCCH Design for CQI Feedback Cycle > 1", R1-082822, 3GPP TSG-RAN WG1 #54, Aug. 22, 2008.
Samsung, "CQI Transmission Supporting Dual-Cell HSDPA", R1-083292, 3GPP TSG RAN WG1 Meeting #54, Aug. 22, 2008.
Samsung, "CQI and ACK/NACK Transmission Supporting Dual-Cell HSDPA", R1-083562, 3GPP TSG RAN WG1 Meeting #54bis, Sep. 29-Oct. 23, 2008.
Huawei, "Discussion on the CQI Report for Dual-Cell HSDPA", R1-084180, 3GPP TSG RAN WG1 Meeting #55, Nov. 10-14, 2008.
Qualcomm Europe, "HS-DPCCH in Support of D-TxAA", R1-062031, 3GPP TSG-RAN WG1 #46, Aug. 28-Sep. 1, 2006.
Japanese Office Action dated Apr. 6, 2015 issued in counterpart application No. 2014-108098.
Korean Office Action dated Sep. 18, 2015 issued in counterpart application No. 10-2014-0025843, 13 pages.

* cited by examiner

CQI TRANSMISSION POWER CONTROL METHOD AND APPARATUS FOR WIRELESS COMMUNICATION SYSTEM SUPPORTING MULTI-CELL HSDPA

PRIORITY

This application is a continuation application of U.S. patent application Ser. No. 13/130,716, which was filed in the U.S. Patent and Trademark Office on May 23, 2011, as National Stage Entry of PCT/KR2009/006946, filed on Nov. 24, 2009, and claims priority to Korean Application Serial No. 10-2008-0117215, which was filed in the Korean Intellectual Property Office on Nov. 25, 2008, the entire content of each of which is incorporated herein by reference.

BACKGROUND OF THE INVENTION

1. Field of the Invention

The present invention relates generally to wireless communications and, more particularly, to a Channel Quality Indicator (CQI) transmission power control method for a wireless communication system supporting multi-cell High Speed Downlink Packet Data Access (HSDPA) in which multiple cells transmit packet data to a user equipment.

2. Description of the Prior Art

Universal Mobile Telecommunications System (UMTS), which is one of the third generation (3G) mobile telecommunication technologies based on the Wideband Code Division Multiple Access (WCDMA), has evolved from Global System for Mobile communications (GSM) and General Packet Radio Services (GPRS) for providing mobile and computer users with packet-based multimedia services including text messaging and voice and video communication services in a consistent service environment.

The UMTS system supports HSDPA service to enhance the packet data transfer speed and capacity in downlink.

In order to secure high speed data transfer rate, HSDPA uses Adaptive Modulation and Coding (AMC) and Hybrid Automatic Repeat Request (HARQ). With the AMC, the Quadrature Phase-Shift Keying (QPSK), 16 Quadrature Amplitude Modulation (16QAM), and 64QAM modulation schemes are selectively used. The AMC technique selects the modulation scheme and coding format and coding rate on the basis of the channel condition and channel type between the Base station and the user equipment (UE) so as to improve the entire cell throughput.

HARQ is implemented with fast retransmission and soft combining techniques. When an erroneous packet is detected, the retransmission is triggered between the base station and UE, and the recipient part combines the retransmitted packet with the previously received packets, thereby reducing the number of retransmission requests to improve overall efficiency. In order to support the HSDPA service, the base station and UE exchange control information such as Orthogonal Variable Spreading Factor (OVSF) codes and number of OVSF codes, Transport Block Sixe (TBS), Modulation and Coding Scheme (MCS), channel index information for HARQ, CQI for indicating the channel condition, and HARQ ACK/NACK.

FIG. 1 is a sequence diagram illustrating operations of a cell and a UE in HSDPA system.

Referring to FIG. 1, first the UE 102 transmits a Channel Quality Indicator (hereinafter called CQI) to a cell 101. Since the UE 102 does not know when the data are transmitted in downlink, it transmits the CQI information periodically (103). When there are data to be sent, the Node B 101 performs scheduling based on the CQI. In the scheduling process, the Node B determines a number of code channels available for allocation and an MCS level. Such information is transmitted to the UE 102 through a High Speed Shared Control Channel (HS-SCCH) (105). The HS-SCCH is received by the UE 102 in a TTI, and the UE 102 receives data by demodulating the HS-PDSCH 106 with reference to the HS-SCCH. In order to make a status report for Hybrid Automatic Repeat Request (HARQ), the UE 102 performs Cyclic Redundancy Check (CRC) to determine Acknowledgement/Non-Acknowledgement (ACK/NACK) (103). If the data are received in error, the UE 102 transmits a NACK to Node B 101 to request retransmission of the data; and otherwise, an ACK to Node B 101 (107). The status reports of ACK/NACK and CQI are transmitted through a High Speed Dedicated Physical Control Channel (HS-DPCCH).

FIG. 2 is a timing diagram illustrating transmissions of the physical channels of an HSDPA system. As shown in FIG. 2, the CQIs 205, 206, and 207 are periodically transmitted via the HS-DPCCH. Node B transmits two slots of the HS-SCCH before it begins transmitting the HS-PDSCH in order for the UE to check the information on the demodulation of the HS-PDSCH. The ACK/NACK information 204 is transmitted 7.5 slots 203 after the transmission of the HS-PDSCH 202 in consideration of the demodulation and decoding of the data carried by the HS-PDSCH.

The Dual-Cell HSDPA operation is described hereinafter with reference to FIG. 3. Unlike the conventional HSDPA in which the UE measures received signals strengths of the cells and connects to the most appropriate cell based on the measurements, the Dual-Cell HSDPA is characterized in that the UE 308 connects to two different cells 301 and 302 defined by two different carriers 303 and 304 of a Node B. The UE 308 receives the HSDPA signals from the second cell 302 in the first carrier f1 304 and from the first cell 301 in the second carrier f2 303, simultaneously. In the WCDMA system, the transmission bandwidth of a cell is 5 MHz such that the UE must have a reception capability of 10 MHz for supporting Dual-Cell HSDPA. Since the HSDPA signals are received from two cells, the maximum transmission rate increases twice. In case of uplink, however, the Dual-Cell transmission function is not supported, whereby the uplink channel is transmitted to only one cell. Even in downlink transmission, common and dedicated channels that are not related to the HSDPA are received from a single cell. Typically, the cell which is in charge of controlling the uplink channel and common and dedicated downlink channels is called an "anchor cell" and the other cell is called a "supplementary cell".

Although the 3GPP standard specifies the Dual-Cell HSDPA service with two cells (including one anchor cell and one supplementary cell) as of year 2008, a multi-cell HSDPA can be implemented with the involvement of more than two cells (including one anchor cell and two or more supplementary cells).

In order for the Dual-Cell HSDPA service to support the HARQ and AMC, the ACK/NACK and CQI should be transmitted to the respective cells, whereby the uplink channel permitted to the anchor cell must be configured to carry the ACK/NACKs and CQIs destined for the anchor and supplementary cells. In this case, the CQIs for the anchor and supplementary cells (each is 5-bit long) are concatenated into 10-bit control information and encoded with a (20, 10) block code. The block coded control information is transmitted through the HS-DPCCH specified for the CQI and ACK/NACK transmission. In case that the Dual-Cell HSDPA operation is not configured, the 5-bit CQI for the anchor cell is encoded with a (20, 5) block code and then transmitted through the HS-DPCCH specified for the CQI and ACK/NACK transmission. The Dual-Cell HSDPA operation is signaled by the base station to the UE.

However, detailed uplink control information transmission method for the multi-cell HSDPA has not been discussed yet until now.

SUMMARY OF THE INVENTION

Accordingly, the present invention is designed to address at least the problems and/or disadvantages described above and to provide at least the advantages described below.

An aspect of the present invention is to provide a method for controlling transmission power of the physical control channel carrying the CQIs for multiple cells in a multi-cell HSDPA system that is capable of securing uniform CQI reception performance.

Another aspect of the present invention is to provide a CQI transmission power control method for a wireless communication system providing multi-cell HSDPA service that secures uniform reception performance for multiple cells at the base station by controlling the transmission powers of the uplink physical control channels carrying the CQI information, resulting in improvement of CQI transmission efficiency and system performance.

In accordance with an aspect of the present invention, a method is provided for transmitting control information by a user equipment in a wireless communication system supporting multi-cell transmission. The method includes receiving a first pilot signal from a first cell and a second pilot signal from a second cell; generating first control information indicating channel quality for the first cell and second control information indicating channel quality for the second cell, based on the first pilot signal and the second pilot signal, respectively; separately encoding the first control information and the second control information; separately power controlling the encoded first control information and the encoded second control information; transmitting the power controlled, encoded first control information on a first control channel; and transmitting the power controlled, encoded second control information on a second control channel. The first control channel and the second control channel are transmitted on the first cell.

In accordance with another aspect of the present invention, a method is provided for receiving control information by a base station in a wireless communication system supporting multi-cell transmission. The method includes transmitting a first pilot signal via a first cell and a second pilot signal via a second cell to a user equipment (UE); receiving first control information indicating channel quality for the first cell based on the first pilot signal on a first control channel from the UE; and receiving second control information indicating channel quality for the second cell based on a second pilot signal on a second control channel from the UE. The first control information and the second control information are encoded and power controlled separately, and the first control channel and the second control channel are transmitted on the first cell.

In accordance with another aspect of the present invention, a user equipment (UE) is provided for transmitting control information in a wireless communication system supporting multi-cell transmission. The UE includes a transceiver configured to receive a first pilot signal from a first cell and a second pilot signal from a second cell; and a controller configured to generate first control information indicating channel quality for the first cell and second control information indicating channel quality for the second cell, based on the first pilot signal and the second pilot signal, respectively, separately encode the first control information and the second control information, separately power control the encoded first control information and the encoded second control information, transmit the power controlled, encoded first control information on a first control channel, and transmit the power controlled, encoded second control information on a second control channel. The first control channel and the second control channel are transmitted on the first cell.

In accordance with another aspect of the present invention, a base station is provided for receiving control information in a wireless communication system supporting multi-cell transmission. The base station includes a transceiver configured to transmit a first pilot signal via a first cell and a second pilot signal via a second cell a user equipment (UE), receive first control information indicating channel quality for the first cell, based on the first pilot signal on a first control channel from the UE, and receive second control information indicating channel quality for the second cell, based on a second pilot signal on a second control channel from the UE; and a controller configured to control the transceiver. The first control information and the second control information are encoded and power controlled separately, and the first control channel and the second control channel are transmitted on the first cell.

BRIEF DESCRIPTION OF THE DRAWINGS

The above and other aspects, features, and advantages of certain embodiments of the present invention will be more apparent from the following detailed description in conjunction with the accompanying drawings, in which.

DETAILED DESCRIPTION OF PREFERRED EMBODIMENTS

Figure 1:
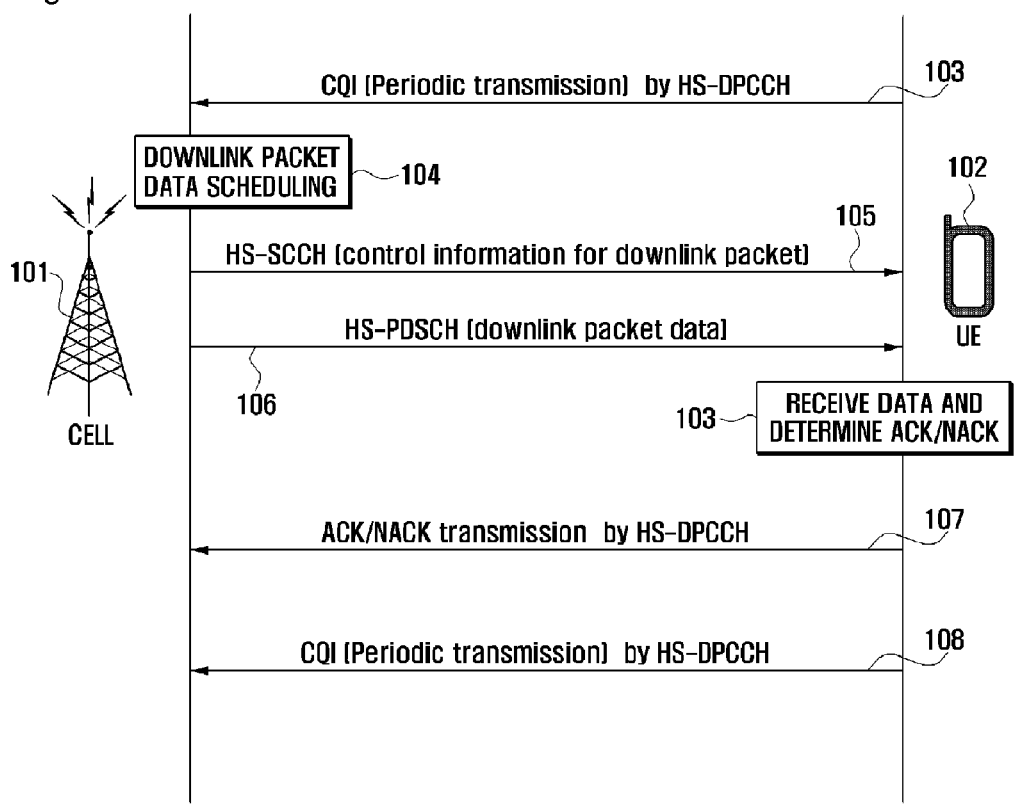
FIG. 1 is a sequence diagram illustrating operations of a cell and a UE in HSDPA system.
Figure 2:
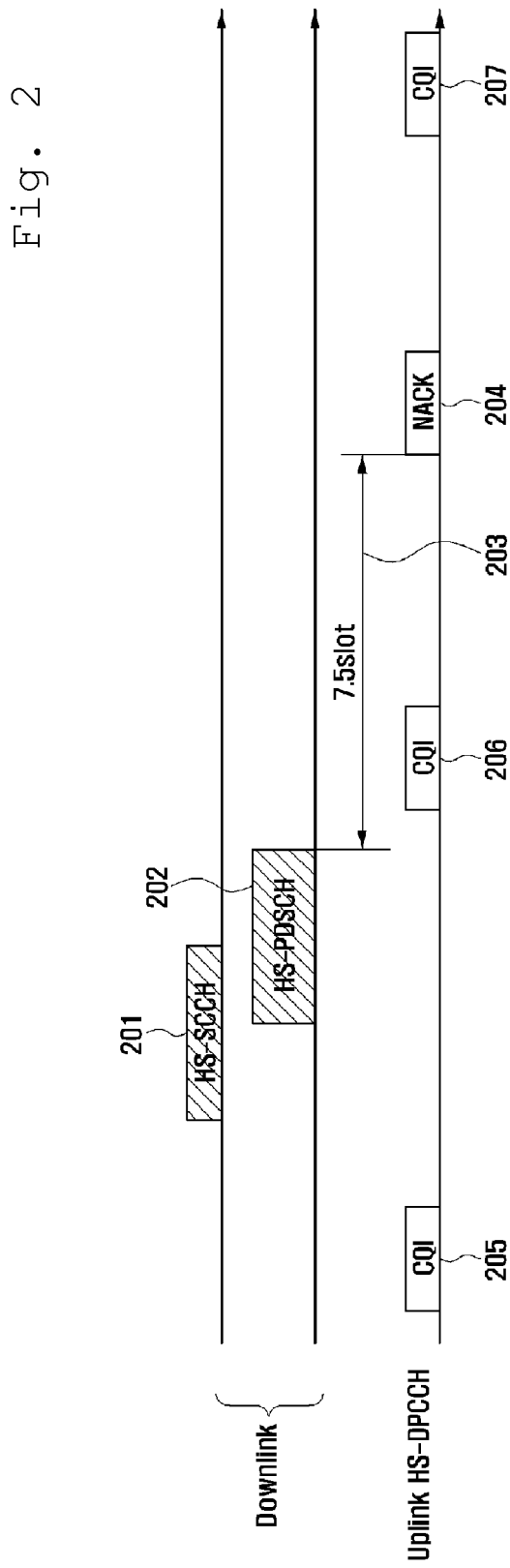
FIG. 2 is a timing diagram illustrating transmissions of the physical channels of an HSDPA system.
Figure 3:
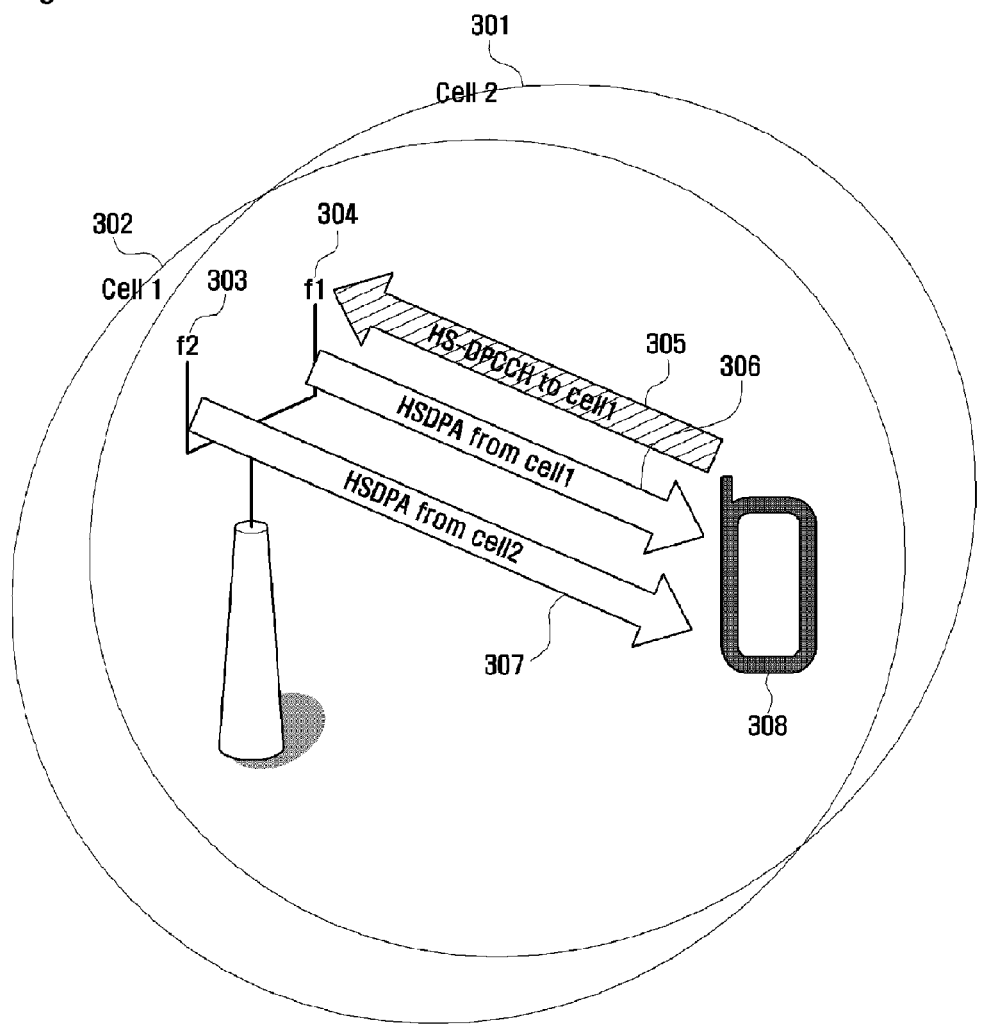
FIG. 3 is a conceptual diagram illustrating a Dual-Cell HSDPA service of a UMTS system.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

In the following description, the CQI transmission power control method of the present invention is directed to the multi-cell HSDPA system in which multiple (N) cells are transmitting the HSDPA service data simultaneously, but the principle of the present invention can be applied to similar types of communication systems.

In an exemplary embodiment of the present invention, the CQI transmission power control method of the present invention is described with an exemplary multi-cell HSDPA system in which N=3, and a UE transmits three 5-bit CQIs, i.e. a CQI(1) for an anchor cell, a CQI(2) for a first supplementary cell, a CQI(3) for a second supplementary cell, simultaneously while securing the uniform CQI reception performance. For this purpose, the UE generates a group of CQIs according to a predetermined rule and compensates the control information on the group to secure the reception performance at the base station.

In more detail, the UE designates the CQI(1) as a first group and the CQI(2) and CQI(3) as a second group, and performs block coding on the CQI(1) with a first channel code. In an exemplary embodiment of the present invention, the first channel code is (20, 5) block code. Unless otherwise noted, the first channel code is (20, 5) block code in the following description. The UE encodes the CQI(1) with the (20, 5) block code and transmits the encoded control information through an HS-DPCCH1 which is the HS-DPCCH defined for carrying the CQI and ACK/NACK information.

The UE also concatenates the CQI(2) and CQI(3) as the second group into 10-bit control information and encodes the second group control information with a second channel code. In an exemplary embodiment of the present invention, the second channel code is (20, 10) block code. Unless otherwise noted, the second channel code is (20, 10) block code in the following description. The UE encodes the CQI(2) and CQI(3) with the (20, 10) block code and transmits the encoded control information through a HS-DPCCH2.

Which control information among the CQI(1), CQI(2), and CQI(3) is encoded with which of the (20, 5) and (20, 10) is determined according to a predetermined rule. The HS-DPCCH1 and HS-DPCCH2 are differentiated by orthogonal codes.

The larger the minimum distance (d_min) as a metric of channel coding performance is or the lower the coding rate is, the superior the error correction performance. Accordingly, the (20, 5) block code is superior to the (20, 10) in error correction capability. In literatures, d_min is 9 in the (20, 5) block code and 6 in the (20, 10) block code. Thus, when the (20, 5) coded bits for the HS-DPCCH1 and the (20, 10) coded bits for the HS-DPCCH2 are transmitted without additional calibration, the reception performance of the CQI(1) transmitted on the HS-DPCCH1 is superior to that of the CQI(2) and CQI(3) transmitted on the HS-DPCCH2 at the base station.

In an exemplary embodiment of the present invention, the UE sets the transmission power of the HS-DPCCH2 to be higher than that of the HS-DPCCH1 in order to secure the uniform CQI reception performance at the cells involved in the multi-cell HSDPA service. The transmission power offset can be preset or signaled from the base station to the UE. Detailed operations of the CQI transmission power control method is described with exemplary embodiments of the present invention. All the description is focused on the multi-cell HSDPA system in which three cells (N=3) are involved in the HSDPA service, the CQI transmission power control method of the present invention is applicable to the multi-cell HSDPA system operating with more than three cells.

In the following description, a CQI transmission power control method for a multi-cell HSDPA system operating with three cells is described as an exemplary case.

Figure 4:
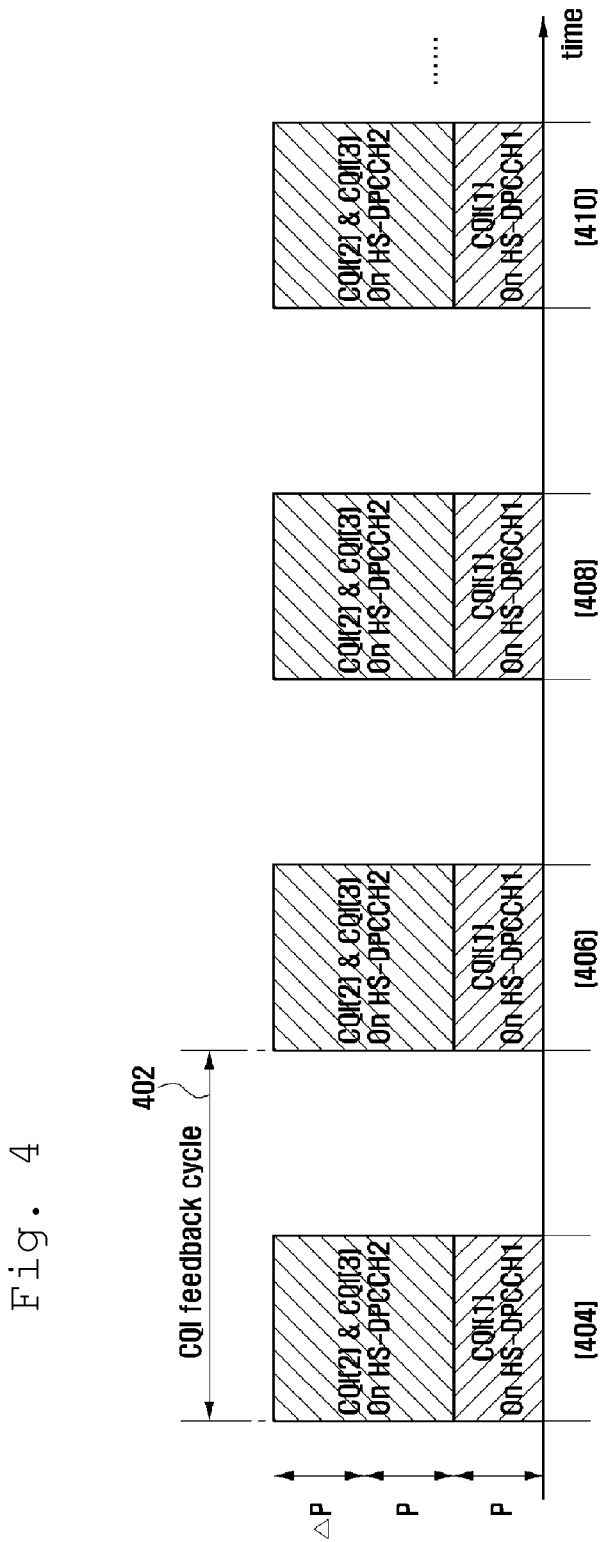
FIG. 4 is a conceptual diagram illustrating a principle of a CQI transmission power control method for a multi-cell HSDPA system according to an exemplary embodiment of the present invention.

FIG. 4 is a conceptual diagram illustrating a principle of a CQI transmission power control method for a multi-cell HSDPA system according to an exemplary embodiment of the present invention.

In the exemplary embodiment of FIG. 4, the UE transmits a 5-bit CQI(1) for the anchor cell, a 5-bit CQI(2) for a first supplementary cell, and a 5-bit CQI(3) for a second supplementary cell simultaneously. In this case, the UE encodes the CQI(1) with (20, 5) block code and transmits the 20 coded bits through the HS-DPCCH1 defined in the standard for transmission of CQI and HARQ ACK/NACK. At the same time, the UE concatenates the CQI(2) and CQI(3) into 10-bit control information, encodes the 10-bit control information with (20, 10) block code, and transmits the 20 coded bits through a newly introduced HS-DPCCH2. This means that the HS-DPCCH1 is coded with a channel code having a relatively high error correction capability and the HS-DPCCH2 is coded with a channel code having a relatively low error correction capability. The block code to be used for encoding each of the CQI(1), CQI(2), and CQI(3) is determined according to a predetermined rule. The HS-DPCCH1 and HS-DPCCH2 are distinguished by orthogonal codes. The CQI information is transmitted during a CQI feedback cycle 402 periodically.

In an exemplary embodiment of the present invention, the transmission power of the HS-DPCCH2 is set with an offset as much as GP greater than that of the HS-DPCCH1 to secure the uniform CQI reception performance at the entire cells involve in the multi-cell HSDPA service with bias to a specific cell. That is, when the transmission power of the HS-DPCCH is P, the transmission power of the HS-DPCCH2 is set to P+GP. The transmission power offset can be preset or signaled from the system to the UE.

The 3GPP standard TS25.212 specifies the (20, 5) block code and (20, 10) block code for HSDPA. The (20, 5) code for encoding CQI in HSDPA uses 5 basis sequences as shown in table 1.

TABLE 1

| i | $M_{i,0}$ | $M_{i,1}$ | $M_{i,2}$ | $M_{i,3}$ | $M_{i,4}$ |
|---|---|---|---|---|---|
| 0 | 1 | 0 | 0 | 0 | 1 |
| 1 | 0 | 1 | 0 | 0 | 1 |
| 2 | 1 | 1 | 0 | 0 | 1 |
| 3 | 0 | 0 | 1 | 0 | 1 |
| 4 | 1 | 0 | 1 | 0 | 1 |
| 5 | 0 | 1 | 1 | 0 | 1 |
| 6 | 1 | 1 | 1 | 0 | 1 |
| 7 | 0 | 0 | 0 | 1 | 1 |
| 8 | 1 | 0 | 0 | 1 | 1 |
| 9 | 0 | 1 | 0 | 1 | 1 |
| 10 | 1 | 1 | 0 | 1 | 1 |
| 11 | 0 | 0 | 1 | 1 | 1 |
| 12 | 1 | 0 | 1 | 1 | 1 |
| 13 | 0 | 1 | 1 | 1 | 1 |
| 14 | 1 | 1 | 1 | 1 | 1 |
| 15 | 0 | 0 | 0 | 0 | 1 |
| 16 | 0 | 0 | 0 | 0 | 1 |
| 17 | 0 | 0 | 0 | 0 | 1 |
| 18 | 0 | 0 | 0 | 0 | 1 |
| 19 | 0 | 0 | 0 | 0 | 1 |

The (20, 5) channel encoding is performed by linear combination of the 5 input information bits with the 5 basis sequences of length 20 as shown in table 1 using equation (1):

$$b_i = \sum_{n=0}^{4} (a_n \times M_{i,n}) \bmod 2 \quad (1)$$

where $a_n$ is $n^{th}$ information bit ($a_0$ is the Least Significant Bit (LSB), and $a_4$ is the Most Significant Bit (MSB)), and $b_i$ is $i^{th}$ output bit, i.e. $i^{th}$ coded bit. Accordingly, the 5 information bits are encoded into 20 coded bits.

The (20, 10) code 10 basis sequences as shown in table 2.

TABLE 2

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 0 | 0 | 0 | 0 | 0 | 0 | 0 | 0 | 0 | 0 |
| 1 | 0 | 1 | 0 | 0 | 0 | 0 | 0 | 0 | 0 | 0 | 0 |
| 2 | 0 | 0 | 0 | 1 | 0 | 0 | 0 | 0 | 0 | 0 | 0 |
| 3 | 0 | 0 | 0 | 0 | 1 | 0 | 0 | 0 | 0 | 0 | 0 |
| 4 | 0 | 0 | 0 | 0 | 0 | 1 | 0 | 0 | 0 | 0 | 0 |
| 5 | 0 | 0 | 0 | 0 | 0 | 0 | 0 | 1 | 0 | 0 | 0 |
| 6 | 0 | 0 | 0 | 0 | 0 | 0 | 0 | 0 | 1 | 0 | 1 |
| 7 | 0 | 0 | 0 | 0 | 0 | 0 | 0 | 0 | 0 | 1 | 1 |
| 8 | 1 | 0 | 1 | 0 | 0 | 0 | 1 | 1 | 1 | 0 | 1 |
| 9 | 1 | 1 | 0 | 1 | 0 | 0 | 0 | 1 | 1 | 1 | 1 |
| 10 | 0 | 1 | 1 | 0 | 1 | 0 | 0 | 0 | 1 | 1 | 1 |
| 11 | 1 | 0 | 1 | 1 | 0 | 1 | 0 | 0 | 0 | 1 | 0 |
| 12 | 1 | 1 | 0 | 1 | 1 | 0 | 1 | 0 | 0 | 0 | 0 |
| 13 | 1 | 1 | 1 | 0 | 1 | 1 | 0 | 1 | 0 | 0 | 0 |
| 14 | 0 | 1 | 1 | 1 | 0 | 1 | 1 | 0 | 1 | 0 | 1 |
| 15 | 0 | 0 | 1 | 1 | 1 | 0 | 1 | 1 | 0 | 1 | 0 |
| 16 | 0 | 0 | 0 | 1 | 1 | 1 | 0 | 1 | 1 | 0 | 1 |
| 17 | 1 | 0 | 0 | 0 | 1 | 1 | 1 | 0 | 1 | 1 | 1 |
| 18 | 0 | 1 | 0 | 0 | 0 | 1 | 1 | 1 | 0 | 1 | 0 |
| 19 | 1 | 1 | 1 | 1 | 1 | 1 | 1 | 1 | 1 | 1 | 1 |

The (20, 10) channel encoding is performed by linear combination of the 10 input information bits with the 10 basis sequences of length 20 as shown in table 2 using equation (2):

$$b_i = \sum_{n=0}^{9} (a_n \times M_{i,n}) \bmod 2 \quad (2)$$

where $a_n$ is $n^{th}$ information bit ($a_0$ is the Least Significant Bit (LSB), and $a_4$ is the Most Significant Bit (MSB)), and $b_i$ is ith output bit, i.e. ith coded bit. Accordingly, the 10 information bits are encoded into 20 coded bits.

Figure 5:
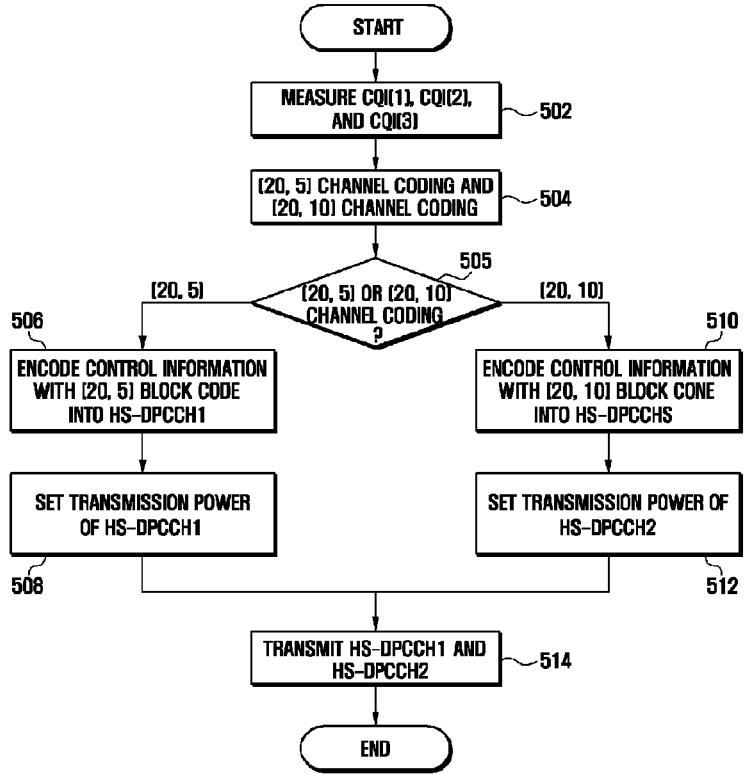
FIG. 5 is a flowchart illustrating a CQI transmission power control method for a multi-cell HSDPA system according to an exemplary embodiment of the present invention.

FIG. 5 is a flowchart illustrating a CQI transmission power control method for a multi-cell HSDPA system according to an exemplary embodiment of the present invention.

Referring to FIG. 5, the UE first measures the Common Pilot Channels (CPICHs) of the anchor cell and the first and second supplementary cells to generate the CQI(1), CQI(2) and CQI(3) indicating channel statuses and MCS levels of the corresponding cells (502). At this time, the UE can classify the CQIs into a first CQI information group and a second CQI information group according to a predetermined rule. Next, the UE encodes one (the first CQI information group) of the three CQIs with (20, 5) block code and concatenates the rest two CQIs and then encodes the concatenated CQIs (the second CQI information group) with (20, 10) block code (504). The channel codes for encoding the CQIs are determined according to a predetermined rule.

For instance, it is possible to assign a serial number (1, 2, and 3) to the respective cells and concatenate the CQIs of the cells assigned the first two serial numbers to be encoded with (20, 10) block code and then encode the CQI of the cell assigned the last serial number with (20, 5) block code. Also, it is possible to encode the CQI of the anchor cell with (20, 5) block code and concatenates and encodes the CQIs of the rest two supplementary cells with (20, 10) block code.

In an exemplary embodiment of the present invention, the UE classifies the one of the CQIs into a first CQI group information and the rest two CQIs into a second CQI group information.

Next, the UE checks the block code used for channel coding on the coded CQI information (505). If the CQI information is coded using (20, 5) block code, the UE spreads the coded bits over the HS-DPCCH1 as the first CQI dedicated physical control channel (506) and sets the transmission power of the HS-DPCCH1 to P (508).

If the CQI information is coded using (20, 10) block code, the UE spreads the coded bits over the HS-DPCCH2 as the second CQI dedicated physical control channel (510) and sets the transmission power of the HS-DPCCH2 to P+ΔP (512). The HS-DPCCH1 and HS-DPCCH2 are distinguished by different orthogonal codes. Finally, the UE transmits the HS-DPCCH1 and HS-DPCCH2 (514).

Table 3 shows the Transport Block Size (TBS), modulation scheme, and a number of HS-DPCCHs corresponding to each of CQI values specified for the current HSDPA system. For instance, the UE retrieves a CQI value corresponding to the measured channel quality of each channel from table 1 and transmits the selected CQI value to the base station through the above described procedure.

TABLE 3

| CQI value | Transport Block Size | Number of HS-PDSCH | Modulation |
|---|---|---|---|
| 0 | N/A | Out of range | |
| 1 | 136 | 1 | QPSK |
| 2 | 176 | 1 | QPSK |
| 3 | 232 | 1 | QPSK |
| 4 | 320 | 1 | QPSK |
| 5 | 376 | 1 | QPSK |
| 6 | 464 | 1 | QPSK |
| 7 | 648 | 2 | QPSK |
| 8 | 792 | 2 | QPSK |
| 9 | 928 | 2 | QPSK |
| 10 | 1264 | 3 | QPSK |
| 11 | 1488 | 3 | QPSK |
| 12 | 1744 | 3 | QPSK |
| 13 | 2288 | 4 | QPSK |

TABLE 3-continued

| CQI value | Transport Block Size | Number of HS-PDSCH | Modulation |
|---|---|---|---|
| 14 | 2592 | 4 | QPSK |
| 15 | 3328 | 5 | QPSK |
| 16 | 3576 | 5 | 16-QAM |
| 17 | 4200 | 5 | 16-QAM |
| 18 | 4672 | 5 | 16-QAM |
| 19 | 5296 | 5 | 16-QAM |
| 20 | 5896 | 5 | 16-QAM |
| 21 | 6568 | 5 | 16-QAM |
| 22 | 7184 | 5 | 16-QAM |
| 23 | 9736 | 7 | 16-QAM |
| 24 | 11432 | 8 | 16-QAM |
| 25 | 14424 | 10 | 16-QAM |
| 26 | 15776 | 10 | 64-QAM |
| 27 | 21768 | 12 | 64-QAM |
| 28 | 26504 | 13 | 64-QAM |
| 29 | 32264 | 14 | 64-QAM |
| 30 | 32264 | 14 | 64-QAM |

Figure 6:
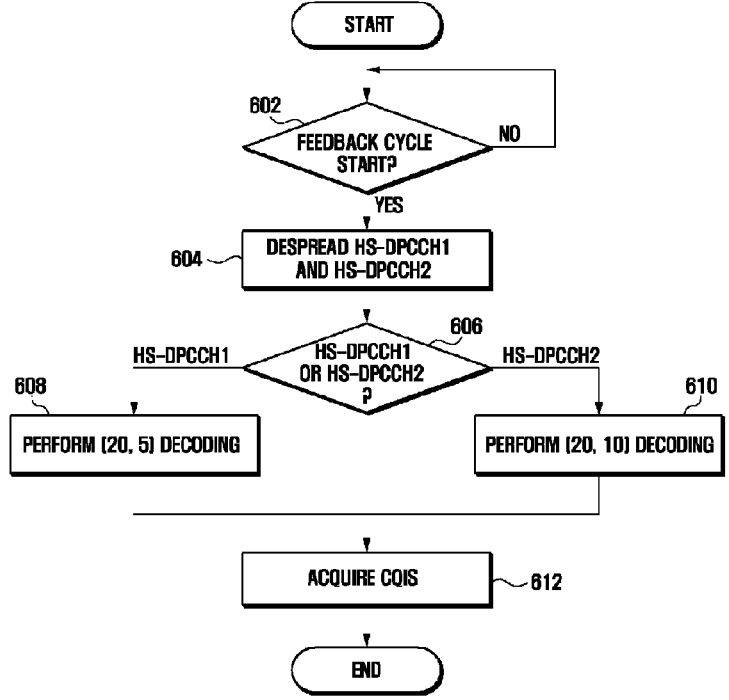
FIG. 6 is a flowchart illustrating a CQI reception procedure of the CQI transmission power control method in the base station according to an exemplary embodiment of the present invention.

FIG. 6 is a flowchart illustrating a CQI reception procedure of the CQI transmission power control method in the base station according to an exemplary embodiment of the present invention. Typically, the multi-cell HSDPA system is implemented with the anchor cell and the supplementary cells belonged to the same base station.

Referring to FIG. 6, first the base station determines whether the CQI feedback cycle is started (602). If the CQI feedback cycle is not started yet, the base station waits for the start of the CQI feedback cycle while checking periodically. If the CQI feedback cycle is started, the base station despreads the HS-DPCCH1 and HS-DPCCH2 using the corresponding orthogonal codes (604). Next, the base station distinguishes the HS-DPCCH1 and the HS-DPCCH2 from each other (606). Once the HS-DPCCH1 and the HS-DPCCH2 are identified, the base station performs decoding on the HS-DPCCH1 with (20, 5) block code (608) and the HS-DPCCH2 with (20, 10) block code (610). As a consequence, the base station acquires the CQIs transmitted on the HS-DPCCH1 and the HS-DPCCH2 (612).

Figure 7:
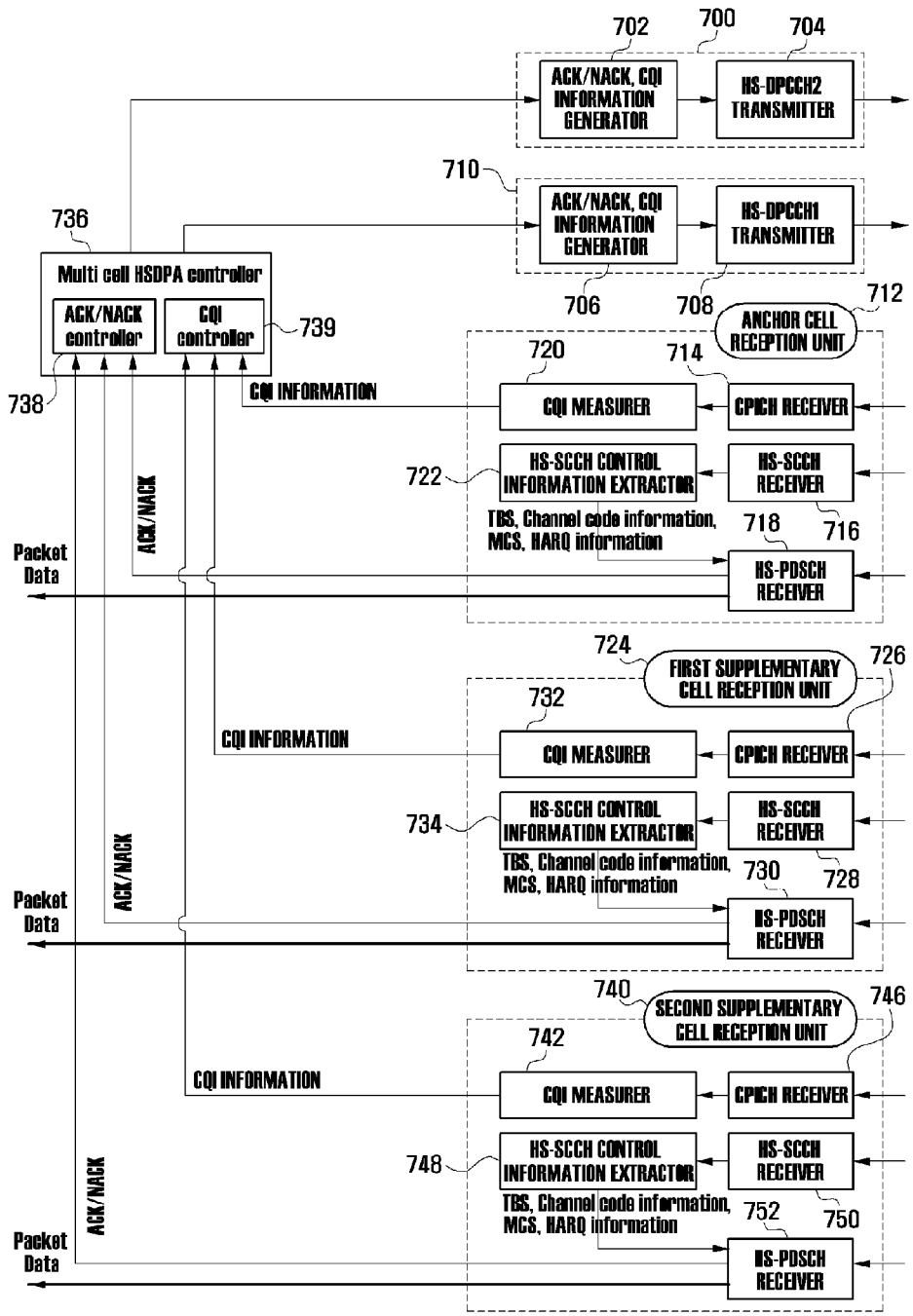
FIG. 7 is a block diagram illustrating a configuration of a UE for supporting the multi-cell HSDPA according to an exemplary embodiment of the present invention.

FIG. 7 is a block diagram illustrating a configuration of a UE for supporting the multi-cell HSDPA according to an exemplary embodiment of the present invention.

As shown in FIG. 7, the UE includes an anchor cell reception unit 712, a first supplementary cell reception unit 724, a second supplementary cell reception unit 740, a first feedback unit 710, a second feedback unit 700, and a multi-cell HSDPA control unit 736.

The anchor cell reception unit 712 includes a CPICH receiver 714, an HS-SCCH receiver 716, an HS-PDSCH receiver 718, a CQI measurer 720, and a HS-SCCH control information extractor 722.

The first supplementary cell reception unit 724 includes a CPICH receiver 726, an HS-SCCH receiver 728, an HS-PDSCH receiver 730, a CQI measurer 732, and a HS-SCCH control information extractor 734.

The second supplementary cell reception unit 740 includes a CPICH receiver 746, an HS-SCCH receiver 750, an HS-PDSCH receiver 752, a CQI measurer 742, and a HS-SCCH control information extractor 748.

The first feedback unit 710 includes a feedback information generator 706 and an HS-DPCCH1 transmitter 708.

The second feedback unit 700 includes a feedback information generator 702 and an HS-DPCCH2 transmitter 704.

The multi-cell HSDPA control unit 736 includes an ACK/NACK controller 738 and a CQI controller 739.

The HS-SCCH receivers 716, 728, and 750 despread, demodulate, and decode the HS-SCCHs received from the corresponding cells.

The HS-SCCH control information extractors 722, 734, and 748 extract information on the HS-PDSCHs (including TBS, channel code information and number, MCS, and HARQ information) from the decoding results output by the corresponding HS-SCCH receivers 716, 728, and 750 and supports the HS-PDSCH reception operations of the HS-PDSCH receivers 718, 730, and 752.

The HS-PDSCH receivers 718, 730, and 752 despread, demodulate, and decode the packet data received from the corresponding cells and output the decoded packet data to the ACK/NACK controller 738 for CRC tests.

The CPICH receivers 714, 726, and 746 receive the CPICH signals transmitted by corresponding cells and output the received CPICH signals to the corresponding CQI measurers 720, 732, and 742.

The CQI measurers 720, 732, and 742 acquire the channel quality information of the corresponding cells from the CPICH signals and generate control information based on the channel quality information. For this purpose, the CQI measurers 720, 732, and 742 measure the received signal qualities of the CPICH signals output by the CPICH receivers 714, 726, and 746 and then provides the measured signal qualities to the CQI controller 739.

The ACK/NACK controller 738 of the multi-cell HSDPA control unit 736 performs CRC tests on the received packet data and determines transmission of ACK/NACK to the corresponding cells.

The CQI controller 739 controls the first and second feedback units 710 and 700 to transmit the CQI(1), CQI(2), and CQI(3) for the anchor cell and the first and second cells simultaneously. The CQI controller 739 controls the first and second feedback units 710 and 700 to group the control information for the corresponding cells according to a predetermined rule and adjust the transmission power of the group control information to secure uniform reception performance at the base station.

As aforementioned, the first feedback unit 710 includes the feedback information generator 706 and the HS-DPCCH1 transmitter 708, and the second feedback unit 700 includes the feedback information generator 702 and the HS-DPCCH2 transmitter 704. In an exemplary embodiment of the present invention, the HS-DPCCH1 transmitter 708 encodes the 5-bit CQI information for one cell using (20, 5) block code, and the HS-DPCCH2 transmitter 704 encodes the 10-bit CQI information for two cells using (20, 10) block code. The first and second feedback units 710 and 700 set the transmission powers of the HS-DPCCH1 transmitter and the HS-DPCCH2 transmitter to different values. For instance, the first feedback unit 710 sets the transmission power of the HS-DPCCH1 transmitter 708 to P, and the second feedback unit 700 sets the transmission power of the HS-DPCCH2 transmitter 704 to P+P.

Figure 8:
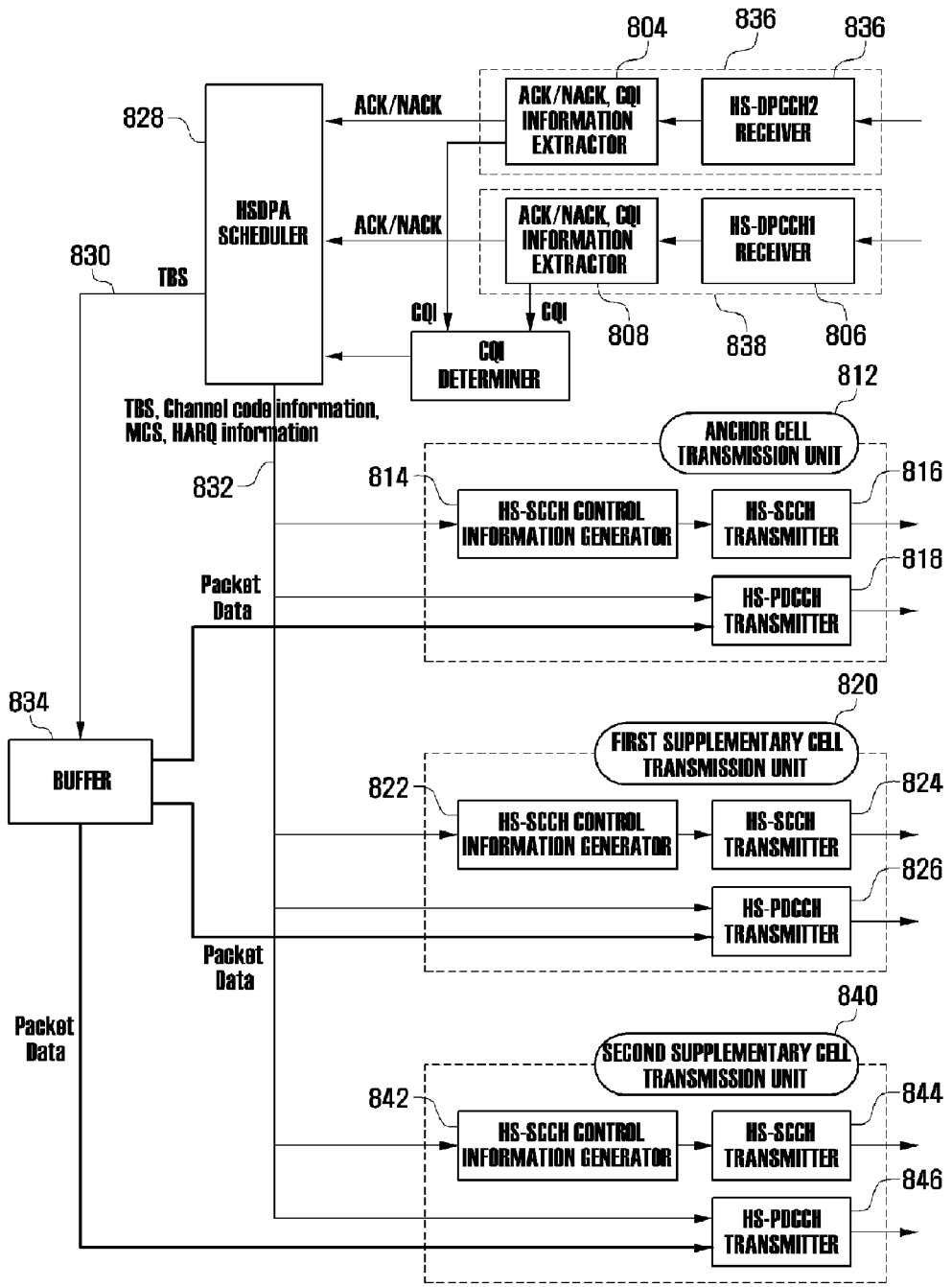
FIG. 8 is a block diagram illustrating a configuration of a base station for supporting the multi-cell HSDPA according to an exemplary embodiment of the present invention.

FIG. 8 is a block diagram illustrating a configuration of a base station for supporting the multi-cell HSDPA according to an exemplary embodiment of the present invention. In the exemplary embodiment of FIG. 8, a common buffer and a common scheduler for processing three cells are used to facilitate the multi-cell HSDPA service.

As shown in FIG. 8, the base station includes an anchor cell transmission unit 812, a first supplementary cell transmission unit 820, a second supplementary cell transmission unit 840, a first feedback reception unit 838, a second feedback reception unit 836, an HSDPA scheduler 828, a buffer 834, and a CQI determiner 810.

The anchor cell transmission unit 812 includes a HS-SCCH control information generator 814, a HS-SCCH transmitter 816, and a HS-PDCCH transmitter 818.

The first supplementary transmission unit 820 includes a HS-SCCH control information generator 822, a HS-SCCH transmitter 824, and a HS-PDCCH transmitter 826.

The second supplementary transmission unit 840 includes a HS-SCCH control information generator 842, a HS-SCCH transmitter 844, and a HS-PDCCH transmitter 846.

The first feedback reception unit 838 includes an HS-DPCCH1 receiver 806 and a feedback information extractor 808.

The second feedback reception unit 836 includes an HS-DPCCH2 receiver 802 and a feedback information extractor 804.

The first and second feedback reception unit 838 and 836 receive the feedback information including ACK/NACK and CQIs transmitted by the UE. The HS-DPCCH2 is transmitted with the transmission power greater than that of the HS-DPCCH1, and the HS-DPCCH1 carries the information coded with a channel code superior to that used for coding the HS-DPCCH2, thereby securing uniform CQI reception performance on the respective physical control channel.

The HS-DPCCH1 receiver 806 and the HS-DPCCH2 receiver 802 despread, demodulate, and decode the respective HS-DPCCH1 and HS-DPCCH 2 and output the decoded information to the corresponding feedback information extractors 808 and 804.

The first and second feedback information extractors 808 and 804 extracts the ACK/NACK and CQI information for the respective cells from the decoded information output by the HS-DPCCH1 receiver 806 and the HS-DPCCH2 receiver 802 and outputs the ACK/NACK information to the HSDPA scheduler 802 and the CQI information to the CQI determiner 810. The CQI determiner 810 calculates the CQI values for the respective cells base on the CQI information provided by the first and second feedback reception units 838 and 836 and outputs the CQI values to the HSDPA scheduler 828.

The HSDPA scheduler 820 determines the TBS, channel code of the HS-PDSCH and number of channel codes, MCS, and HARQ information based on the ACK/NACK and CQI information provided by the first and second feedback reception units 838 and 836 and the CQI determiner 810. The HSDPA scheduler 828 generates the packet data into the buffer 834 to be supplied to the HS-PDCCH transmitters 818, 826, and 846. The HSDPA scheduler 828 also provides the information on the TBS, channel code of the HS-PDSCH and number of channel code, MCS, and HARQ information to the HS-DPSCH transmitters 818, 826, and 846 such that the HS-PDSCH transmitters 818, 826, and 846 transmit the packet data based on the information provided by the HSDPA scheduler 828.

The HSDPA scheduler 828 also sends the control information to the HS-SCCH control information generators 814, 822, and 842 such that the control information is processed into appropriate format by the HS-SCCH control information generators 814, 822, and 842 and then transmitted by means of the HS-SCCH transmitters 816, 824, and 844. The number of the HS-SCCH control information generators corresponds to the number of the cells involved in the multi-cell HSDPA service.

As described above, the CQI transmission power control method for a wireless communication system providing multi-cell HSDPA service is capable of controlling the transmission powers of the uplink physical control channels carrying the CQI information so as to secure the uniform reception performance for multiple cells at the base station, resulting in improvement of CQI transmission efficiency and system performance.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method of transmitting control information by a user equipment in a wireless communication system supporting multi-cell transmission, the method comprising:
   receiving a first pilot signal from a first cell corresponding to a first cell identifier (ID) and a second pilot signal from a second cell corresponding to a second cell ID;
   generating first control information indicating channel quality for the first cell and second control information indicating channel quality for the second cell, based on the first pilot signal and the second pilot signal, respectively, the first control information including a first number of information bits and the second control information including a second number of information bits;
   separately encoding the first control information and the second control information;
   separately power controlling the encoded first control information and the encoded second control information based on the first number of information bits for the first control information and the second number of information bits for the second control information;
   transmitting the power controlled, encoded first control information on a first control channel; and
   transmitting the power controlled, encoded second control information on a second control channel,
   wherein the first control channel and the second control channel are transmitted on the first cell.

2. The method of claim 1, further comprising:
   receiving a first packet data from the first cell and a second packet data from the second cell; and
   transmitting at least one ACK/NACK information corresponding to at least one of the first packet data and the second packet data.

3. The method of claim 2, further comprising receiving control information for the first data packet and the second packet data before receiving the first and second packet data.

4. The method of claim 1, wherein the encoding includes block coding.

5. The method of claim 1, wherein the power controlling is performed based on a number of information bits transmitted on each of the first control channel and the second control channel, respectively.

6. The method of claim 1, wherein the first cell comprises a primary cell.

7. A method of receiving control information by a base station in a wireless communication system supporting multi-cell transmission, the method comprising:
   transmitting a first pilot signal via a first cell corresponding to a first cell identifier (ID) and a second pilot signal via a second cell corresponding to a second cell ID to a user equipment (UE);
   receiving first control information indicating channel quality for the first cell based on the first pilot signal on a first control channel from the UE, the first control information including a first number of information bits; and
   receiving second control information indicating channel quality for the second cell based on a second pilot signal on a second control channel from the UE, the second control information including a second number of information bits, wherein the first control information and the second control information are separately encoded, wherein the encoded first control information and the encoded second control information are separately power controlled based on the first number of information bits for the first control information and the second number of information bits for the second control information, and wherein the first control channel and the second control channel are transmitted on the first cell.

8. The method of claim 7, further comprising:
transmitting a first packet data from the first cell and a second packet data from the second cell to the UE; and
receiving at least one ACK/NACK information corresponding to at least one of the first packet data and the second packet data.

9. The method of claim 8, further comprising transmitting control information for the data packet before transmitting the packet data.

10. The method of claim 7, wherein the first control information and the second control information are encoded using block coding.

11. The method of claim 7, wherein the first control information and the second control information are power controlled based on a number of information bits transmitted on each of the first control channel and the second control channel, respectively.

12. The method of claim 7, wherein the first cell comprises a primary cell.

13. A user equipment (UE) for transmitting control information in a wireless communication system supporting multi-cell transmission, the UE comprising:
a transceiver configured to receive a first pilot signal from a first cell corresponding to a first cell identifier (ID) and a second pilot signal from a second cell corresponding to a second cell ID; and
a controller configured to
generate first control information indicating channel quality for the first cell and second control information indicating channel quality for the second cell, based on the first pilot signal and the second pilot signal, respectively, the first control information including a first number of information bits and the second control information including a second number of information bits,
separately encode the first control information and the second control information,
separately power control the encoded first control information and the encoded second control information based on the first number of information bits for the first control information and the second number of information bits for the second control information,
transmit the power controlled, encoded first control information on a first control channel, and
transmit the power controlled, encoded second control information on a second control channel,
wherein the first control channel and the second control channel are transmitted on the first cell.

14. The UE of claim 13, wherein the transceiver is further configured to receive a first packet data from the first cell and a second packet data from the second cell, and to transmit at least one ACK/NACK information corresponding to at least one of the first packet data and the second packet data.

15. The UE of claim 14, wherein the transceiver is further configured to receive control information for the first data packet and the second packet data before receiving the first and second packet data.

16. The UE of claim 13, wherein the controller is further configured to encode using block coding.

17. The UE of claim 13, wherein the controller is further configured to power control based on a number of information bits transmitted on each of the first control channel and the second control channel, respectively.

18. The UE of claim 13, wherein the first cell comprises a primary cell.

19. A base station for receiving control information in a wireless communication system supporting multi-cell transmission, the base station comprising:
a transceiver configured to
transmit a first pilot signal via a first cell corresponding to a first cell identifier (ID) and a second pilot signal via a second cell corresponding to a second cell ID to a user equipment (UE),
receive first control information indicating channel quality for the first cell, based on the first pilot signal on a first control channel from the UE, the first control information including a first number of information bits, and
receive second control information indicating channel quality for the second cell, based on a second pilot signal on a second control channel from the UE, the second control information including a second number of information bits; and
a controller configured to control the transceiver,
wherein the first control information and the second control information are separately encoded,
wherein the encoded first control information and the encoded second control information are separately power controlled based on the first number of information bits for the first control information and the second number of information bits for the second control information, and
wherein the first control channel and the second control channel are transmitted on the first cell.

20. The base station of claim 19, wherein the transceiver is further configured to transmit a first packet data from the first cell and a second packet data from the second cell to the UE, and to receive at least one ACK/NACK information corresponding to at least one of the first packet data and the second packet data.

21. The base station of claim 20, wherein the transceiver is further configured to transmit control information for the data packet before transmitting the packet data.

22. The base station of claim 19, wherein the first control information and the second control information are encoded using block coding.

23. The base station of claim 19, wherein the first control information and the second control information are power controlled based on a number of information bits transmitted on each of the first control channel and the second control channel, respectively.

24. The base station of claim 19, wherein the first cell comprises a primary cell.

* * * * *